United States Patent
Pan et al.

(10) Patent No.: US 12,091,849 B2
(45) Date of Patent: Sep. 17, 2024

(54) DOUBLE-FRICTION PENDULUM THREE-DIMENSIONAL VIBRATION ISOLATION BEARING

(71) Applicant: TSINGHUA UNIVERSITY, Beijing (CN)

(72) Inventors: Peng Pan, Beijing (CN); Yingri Cao, Beijing (CN); Haishen Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/169,170

(22) Filed: Feb. 14, 2023

(65) Prior Publication Data
US 2023/0193623 A1    Jun. 22, 2023

Related U.S. Application Data

(63) Continuation of application No. PCT/CN2021/130356, filed on Nov. 12, 2021.

(30) Foreign Application Priority Data

Dec. 10, 2020  (CN) .......................... 202011455646.0

(51) Int. Cl.
| | | |
|---|---|---|
| *E04B 1/98* | (2006.01) | |
| *E04B 1/36* | (2006.01) | |
| *F16F 13/04* | (2006.01) | |

(52) U.S. Cl.
CPC .................. *E04B 1/98* (2013.01); *E04B 1/36* (2013.01); *F16F 13/04* (2013.01)

(58) Field of Classification Search
CPC ............... F16B 13/04; E04B 1/98; E04B 1/36
See application file for complete search history.

(56) References Cited

U.S. PATENT DOCUMENTS

| 4,499,694 A * | 2/1985 | Buckle | ...................... E04B 1/98 |
| | | | 52/167.7 |
| 6,021,992 A * | 2/2000 | Yen | ........................... F16F 7/08 |
| | | | 248/560 |

(Continued)

FOREIGN PATENT DOCUMENTS

| CN | 103015554 A | 4/2013 |
| CN | 104343186 A | 2/2015 |

(Continued)

OTHER PUBLICATIONS

Notice of Reasons for Refusal received in Japanese Patent Application No. JP 2022-515914, dated May 2, 2023. English translation attached.

(Continued)

*Primary Examiner* — Monica E Millner

(57) ABSTRACT

A double-friction pendulum three-dimensional vibration isolation bearing (1), includes a first support plate (10), a second support plate (20), a vertical vibration isolation unit, a first sliding end portion (40) and a second sliding end portion (50). At least one of the first support plate (10) and the second support plate (20) is movable. The vertical vibration isolation unit is disposed between the first support plate (10) and the second support plate (20).

10 Claims, 4 Drawing Sheets

(56) References Cited

U.S. PATENT DOCUMENTS

| | | | |
|---|---|---|---|
| 8,973,887 B2* | 3/2015 | Nakata | F16C 29/02 267/141.1 |
| 9,175,468 B1 | 11/2015 | Tsai | |
| 9,435,087 B2* | 9/2016 | Kim | E01D 19/046 |
| 9,446,417 B2* | 9/2016 | Gaudio | B04B 9/146 |
| 9,617,730 B1* | 4/2017 | Tsai | E04H 9/022 |
| 9,945,116 B2* | 4/2018 | Tsai | F16F 7/087 |
| 10,501,899 B2* | 12/2019 | Braun | E04H 9/021 |
| 10,662,645 B2* | 5/2020 | Kochiyama | F16F 15/022 |
| 10,767,384 B2* | 9/2020 | Wakita | E04B 1/36 |
| 10,815,627 B2* | 10/2020 | Yang | E01D 19/02 |
| 11,136,779 B2* | 10/2021 | Kim | E04B 1/36 |
| 11,692,608 B2* | 7/2023 | Pothier | F16F 1/121 248/566 |
| 2005/0241245 A1* | 11/2005 | Tsai | E04H 9/023 52/167.1 |
| 2006/0174555 A1* | 8/2006 | Zayas | E04H 9/021 52/167.4 |
| 2008/0098671 A1* | 5/2008 | Tsai | E04H 9/023 52/167.6 |
| 2008/0222975 A1* | 9/2008 | Nakata | E04H 9/022 384/40 |
| 2010/0095608 A1* | 4/2010 | Marioni | E04H 9/021 52/167.4 |
| 2011/0227265 A1* | 9/2011 | Fujita | F16F 15/027 267/140.13 |
| 2012/0174500 A1* | 7/2012 | Yakoub | E04B 1/98 52/167.6 |
| 2013/0148917 A1* | 6/2013 | Chuang | F16C 29/02 384/36 |
| 2015/0191906 A1* | 7/2015 | Kochiyama | F16F 9/306 52/167.7 |
| 2016/0122498 A1* | 5/2016 | Wake | C08K 3/28 524/436 |
| 2016/0215495 A1* | 7/2016 | Nakamura | E04H 9/0215 |
| 2021/0301900 A1* | 9/2021 | Zhou | F16F 15/046 |

FOREIGN PATENT DOCUMENTS

| | | |
|---|---|---|
| CN | 105863098 A | 8/2016 |
| CN | 106049686 A | 10/2016 |
| CN | 106381934 A | 2/2017 |
| CN | 108842921 A | 11/2018 |
| CN | 108867911 A | 11/2018 |
| CN | 110042750 A | 7/2019 |
| CN | 110130500 A | 8/2019 |
| CN | 110468695 A | 11/2019 |
| CN | 111962699 A | 11/2020 |
| CN | 212001610 U | 11/2020 |
| CN | 112681854 A | 4/2021 |
| JP | H11351325 A | 12/1999 |
| JP | 2004360797 A | 12/2004 |
| JP | 2010276185 A | 12/2010 |
| JP | 2019035493 A | 3/2019 |

OTHER PUBLICATIONS

International Search Report dated Jan. 30, 2022 in International Application No. PCT/CN2021/130356. English translation attached.
First Office Action from corresponding Chinese Application No. 202011455646.0, dated Aug. 9, 2021 . English translation attached.
The Grant Notice from corresponding Chinese Application No. 202011455646.0, dated Oct. 22, 2021. English translation attached.

* cited by examiner

DOUBLE-FRICTION PENDULUM THREE-DIMENSIONAL VIBRATION ISOLATION BEARING

CROSS-REFERENCES TO RELATED APPLICATIONS

The present application is a continuation of International Application No. PCT/CN2021/130356, filed on Nov. 12, 2021, which is based on and claims priority to Chinese Patent Application No. 202011455646.0, filed on Dec. 10, 2020, the entire content of which is incorporated herein by reference.

FIELD

The present disclosure relates to the technical field of civil engineering structures, in particular to a double-friction pendulum three-dimensional vibration isolation bearing.

BACKGROUND

At present, the commonly used vibration isolation bearings such as laminated rubber vibration isolation bearings, etc., the natural vibration period of the vibration isolation bearings is related to the mass of the upper part, so the isolation vibration (shake) performance will change with the mass of the upper structure, which is not conducive to the design and long-term use. At the same time, the vertical vibration of the ground caused by subway vibration will affect the use comfort level of the building, and the current vibration isolation bearing lacks the vibration isolation ability to the vertical vibration of the environment.

SUMMARY

The present disclosure is made based on the inventor's findings and knowledge of the following facts and problems.

The inventor found that, in order to improve the vibration isolation capability of the vibration isolation bearing against the vertical vibration of the environment, in the related art, a vertical vibration isolation unit is arranged in a sliding block of the double-friction pendulum vibration isolation bearing. The vertical vibration isolation unit has a large vertical bearing capacity and a small stiffness to reduce the natural vibration period of the vibration isolation bearing. At the same time, the commonly used vibration isolation units also generally have energy dissipation capacity, which may dissipate the energy of vertical vibration. The combined effect of the two mechanisms may achieve the effect of vertical vibration isolation. However, due to the limitation of the installation space inside the double-friction pendulum vibration isolation bearing, the cross-sectional area of the vertical vibration isolation unit is limited, resulting in a limited adjustable range of the bearing capacity of the vertical vibration isolation unit, which may not well meet the vertical vibration isolation and support requirements under different vibration amplitudes.

The present disclosure aims to solve one of the technical problems in the related art at least to a certain extent.

To this end, the embodiments of the present disclosure propose a double-friction pendulum three-dimensional vibration isolation bearing. The double-friction pendulum three-dimensional vibration isolation bearing has a large vertical bearing capacity and vertical stiffness adjustable range, and has strong design properties, which may meet the vibration isolation and support requirements in different vibration environments.

The double-friction pendulum three-dimensional vibration isolation bearing according to the embodiment of the present disclosure includes: a first support plate, a second support plate, a vertical vibration isolation unit, a first sliding end portion, and a second sliding end portion. The first support plate has a lower end surface as a first sliding friction surface. The first sliding friction surface is a concave spherical surface. The second support plate has an upper end surface as a second sliding friction surface. The second sliding friction surface is a concave spherical surface. The second support plate and the first support plate are spaced apart from each other in an up-down direction. The second support plate is located below the first support plate. At least one of the first support plate and the second support plate is movable in a horizontal direction. The vertical vibration isolation unit is disposed between the first support plate and the second support plate. The vertical vibration isolation unit is slidable relative to the first support plate and the second support plate. The vertical vibration isolation unit has a large vertical bearing capacity, and a small vertical stiffness, and an adjustable cross-sectional area to allow the vertical bearing capacity of the vertical vibration isolation unit to be adjustable. The first sliding end portion is located between the first support plate and the vertical vibration isolation unit. The first sliding end portion is slidable relative to the first sliding friction surface. and the first sliding end portion has a lower end connected to a top of the vertical vibration isolation unit and an upper end surface at least partially attached with the first sliding friction surface. The second sliding end portion is located between the second support plate and the vertical vibration isolation unit. The second sliding end portion is slidable relative to the second sliding friction surface. and the second sliding end portion has an upper end connected to a bottom of the vertical vibration isolation unit and a lower end surface at least partially attached with the second sliding friction surface.

According to the double-friction pendulum three-dimensional vibration isolation bearing according to the embodiment of the present disclosure, the vertical vibration isolation unit is disposed between the first support plate and the second support plate, the first sliding end portion is disposed between the vertical vibration isolation unit and the first support plate, the second sliding end portion is disposed between the vertical vibration isolation unit and the second support plate, the first sliding end portion is slidable relative to the first support plate, and the second sliding end portion is slidable relative to the second support plate, which may allow the vertical vibration isolation unit to be movable relative to the first support plate and the second support plate to realize the vibration isolation in the horizontal direction, and also prevent the vertical vibration isolation unit from directly matching with the first support plate and the second support plate to eliminate the limitation on the magnitude of the cross-sectional area of the vertical vibration isolation unit by the first support plate and the second support plate, and to facilitate the adjustment the vertical bearing capacity of the three-dimensional vibration isolation bearing to meet the vertical vibration isolation requirements in different vibration environments.

In some embodiments, the vertical vibration isolation unit includes a first connecting plate, a second connecting plate, and an elastic support member. The first connecting plate is in contact with the first sliding end portion. The second connecting plate is in contact with the second sliding end portion and is spaced apart from the first connecting plate in the up-down direction. The first connecting plate is located above the second connecting plate. The first connecting plate has a centrally symmetric shape same as the second connecting plate. The elastic support member is disposed between the first connecting plate and the second connecting plate.

In some embodiments, the first sliding end portion includes a first connecting portion and a first sliding block. The first connecting portion has a lower end surface in contact with an upper end surface of the first connecting plate. The first sliding block has an upper end surface in contact with the first sliding friction surface, and a lower end surface in contact with an upper end surface of the first connecting portion. The first sliding block has a cross-sectional area smaller than a cross-sectional area of the first connecting portion. The second sliding end portion includes: a second connecting portion and a second sliding block. The second connecting portion has an upper end surface connected to a lower end surface of the second connecting plate. The second sliding block has a lower end surface in contact with the second sliding friction surface and an upper end surface connected to a lower end surface of the second connecting portion. The second sliding block has a cross-sectional area smaller than a cross-sectional area of the second connecting portion.

In some embodiments, the elastic support member is an elastic material block. The elastic material block is made of a pure elastic material or formed by alternately stacking a plurality of layers of rubber material blocks and a plurality of layers of metal plates.

In some embodiments, the elastic support member is composed of disc springs based on a designed stacking manner.

In some embodiments, the vertical vibration isolation unit further includes a guide rod. The guide rod has a lower end connected to an upper end surface of the second sliding end portion. The first connecting plate has a first perforation defined therein. The second connecting plate has a second perforation defined therein. The lower end surface of the first connecting portion has a first groove defined thereon. The first groove, the first perforation, and the second perforation are opposite to each other in the up-down direction. An upper end of the guide rod passes through the first perforation and the second perforation, and protrudes into the first groove. A gap is defined between an upper end surface of the guide rod and an inner bottom surface of the first groove. The elastic support member is sleeved over the guide rod. The elastic support member has an upper end surface in contact with a lower end surface of the first connecting plate and a lower end surface in contact with an upper end surface of the second connecting plate.

In some embodiments, the first connecting plate has a second groove defined on a lower end surface thereon. The vertical vibration isolation unit further includes a guide rod. The guide rod has a lower end connected to an upper end surface of the second connecting plate and an upper end engaged in the second groove. A gap is defined between an upper end surface of the guide rod and an inner bottom surface of the second groove. The elastic support member is sleeved over the guide rod. The elastic support member has an upper end surface in contact with the lower end surface of the first connecting plate and a lower end surface in contact with an upper end surface of the second connecting plate.

In some embodiments, a plurality of second grooves, a plurality of guide rods and a plurality of elastic support members are provided and correspond to each other. The plurality of guide rods is symmetrically arranged at intervals relative to a centroid center of the second connecting plate.

In some embodiments, a plurality of protruding pillars is arranged on the lower end surface of the first connecting plate. The second groove is defined on a lower end surface of each of the plurality of protruding pillars.

In some embodiments, the double-friction pendulum three-dimensional vibration isolation bearing further includes a first connecting member and a second connecting member. The first connecting portion has a first through hole penetrating the first connecting portion in the up-down direction. The second connecting portion has a second through hole penetrating the second connecting portion in the up-down direction. The first connecting member passes through the first through hole and protrudes into the first connecting plate. The second connecting member passes through the second through hole and protrudes into the second connecting plate.

In some embodiments, the upper end surface of the first sliding end portion is a first convex arc surface. The first convex arc surface has a curvature radius same as a curvature radius of the first sliding friction surface, and an area equal to or smaller than an area of the first sliding friction surface. A lower end surface of the second sliding end portion is a second convex arc surface. The second convex arc surface has a curvature radius same as a curvature radius of the second sliding friction surface, and an area equal to or smaller than an area of the second sliding friction surface.

In some embodiments, the first support plate has a first retaining ring provided thereon and extending downwardly. The first retaining ring is disposed on an outer periphery of the first sliding friction surface. The second support plate has a second retaining ring provided thereon and extending upwardly. The second retaining ring is disposed on an outer periphery of the second sliding friction surface.

BRIEF DESCRIPTION OF DRAWINGS

The above and/or additional aspects and advantages of the present disclosure will become apparent and readily understood from the following description of embodiments in conjunction with the accompanying drawings.

Figure 1:
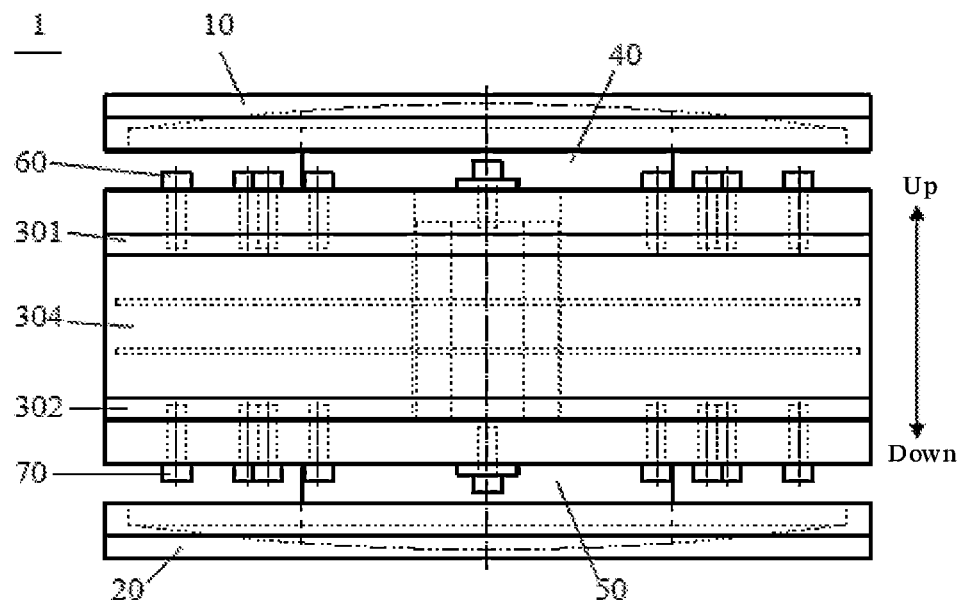
FIG. 1 is a schematic structural diagram of a double-friction pendulum three-dimensional vibration isolation bearing according to an embodiment of the present disclosure.

REFERENCE NUMBER double-friction pendulum three-dimensional vibration isolation bearing 1;
first support plate 10; first sliding friction surface 101; first retaining ring 102;
second support plate 20; second sliding friction surface 201; second retaining ring 202;
first connecting plate 301; first perforation 3011; second groove 3012; protruding pillar 3013; second connecting plate 302; second perforation 3021; guide rod 303; elastic support member 304; elastic support block 3041; inner plate 3042;
first sliding end portion 40; first connecting portion 401; first through hole 4011; first groove 4012; first sliding block 402; first convex arc surface 403;
second sliding end portion 50; second connecting portion 501; second through hole 5011; second sliding block 502; second convex arc surface 503;
first connecting member 60; second connecting member 70.

DESCRIPTION OF EMBODIMENTS

The embodiments of the present disclosure are described in detail below. Examples of the embodiments are shown in the accompanying drawings. The embodiments described below with reference to the accompanying drawings are exemplary, and are intended to explain the present disclosure, but should not be construed as limiting the present disclosure.

As shown in FIGS. 1 to 7, the double-friction pendulum three-dimensional vibration isolation bearing 1 according to the embodiment of the present disclosure includes a first support plate 10, a second support plate 20, a vertical vibration isolation unit, and a first sliding end plate 40 and the second sliding end plate 50.

Figure 2:
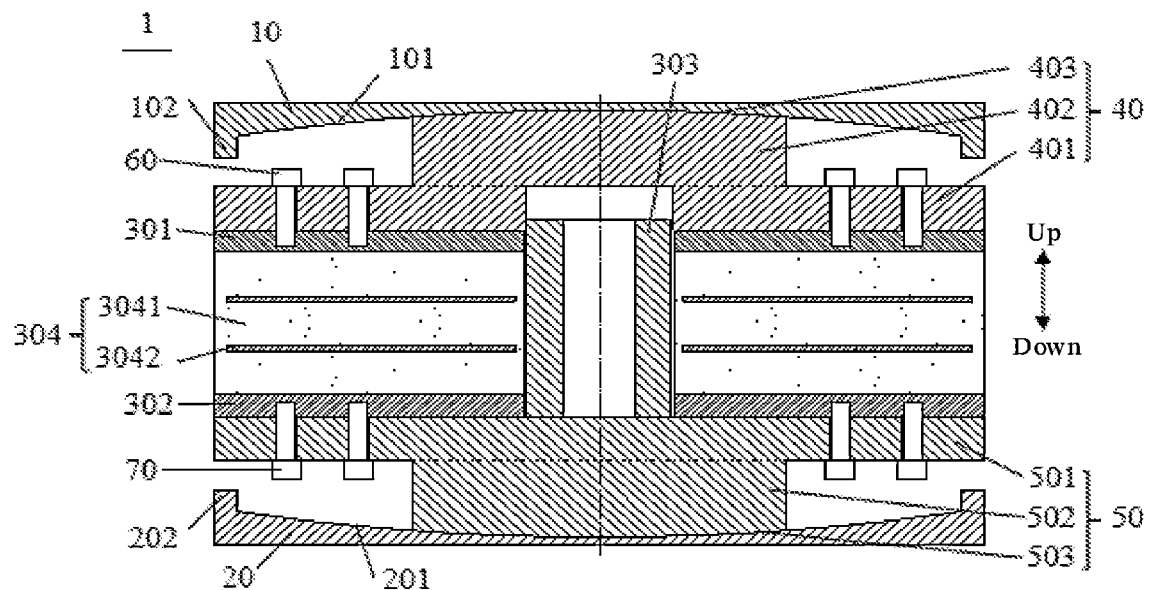
FIG. 2 is a cross-sectional view of the double-friction pendulum three-dimensional vibration isolation bearing in FIG. 1.

As shown in FIG. 1 and FIG. 2, the second support plate 20 and the first support plate 10 are spaced apart from each other in an up-down direction. The second support plate 20 is located below the first support plate 10. The first support plate 10 and the second support plate 20 may move relative to each other in a horizontal direction (the "horizontal direction" here may be understood as any direction in a horizontal plane perpendicular to the up-down direction). A lower end surface of the first support plate 10 is a first sliding friction surface 101, and a lower end surface of the second support plate is a second sliding friction surface 201. The first sliding friction surface 101 and the second sliding friction surface 201 are both spherical surfaces. An upper end of the vertical vibration isolation unit is connected to and is slidable relative to the first sliding friction surface 101, and a lower end of the vertical vibration isolation unit is connected to and is slidable relative to the second sliding friction surface 201.

It should be noted that, in the construction project, the first support plate 10 is connected to an upper structure, and the second support plate 20 is connected to a lower structure or a foundation, so that a vibration isolation layer with a small horizontal stiffness can be constructed in the structure, reducing the response of the ground horizontal vibration in the upper structure.

Specifically, as shown in FIGS. 1, 2, 3, 5 and 6, the first sliding end portion 40 is located between the first support plate 10 and the vertical vibration isolation unit. A lower end of the first sliding end portion 40 is connected to a top of the vertical vibration isolation unit. An upper end surface of the first sliding end portion 40 is at least partially attached with the first sliding friction surface 101. The first sliding end portion 40 is slidable relative to the first support plate 10.

As shown in FIGS. 1 and 2, the second sliding end portion 50 is located between the second support plate 20 and the vertical vibration isolation unit. An upper end of the second sliding end portion 50 is connected to a bottom of the vertical vibration isolation unit. A lower end surface of the second sliding end portion 50 is at least partially attached with the second sliding friction surface 201. The second sliding end portion 50 is slidable relative to the second support plate 20. Therefore, under the action of the horizontal load, the first support plate 10 will move horizontally relative to the second support plate 20, and the vertical vibration isolation unit slides on the sliding friction surface together with the first sliding end portion 40 and the second sliding end portion 50 at both ends.

It may be understood that the vertical load of the upper structure is transmitted to the vertical vibration isolation unit through the first support plate 10 and the first sliding end portion 40, is further transmitted from the vertical vibration isolation unit to the second sliding end portion 50 and the second support plate 20, and is finally transmitted to the lower structure or the foundation. By arranging a vertical vibration isolation unit with a large vertical bearing capacity and a small vertical rigidity in the vertical load transmission path, the double-friction pendulum three-dimensional vibration isolation bearing 1 will have a small natural vibration period to be used for vertical vibration isolation.

The inventor found that the vertical vibration isolation assembly in the related art only includes the vertical vibration isolation unit, and the vertical vibration isolation unit is in direct contact with the first support plate 10 and the second support plate 20. Due to the limitation of the cross-sectional areas of the first support plate 10 and the second support plate 20, the slidable region of the vertical vibration isolation unit is limited. In order to satisfy the relative sliding of the first support plate 10, the second support plate 20 and the vertical vibration isolation unit, a maximum outer diameter of the vertical vibration isolation unit must be smaller than a maximum outer diameter of the corresponding sliding surface, resulting in a limited adjustable range of the cross-sectional area of the vertical vibration isolation unit, which is not suitable for different vibration environments.

On the basis of the above problems, the inventor proposes to match the vertical vibration isolation unit with the first support plate 10 through the first sliding end portion 40, and match the vertical vibration isolation unit with the second support plate 20 through the second sliding end portion 50. The plane dimensions of the first sliding end portion 40 and the second sliding end portion 50 may be independent of the plane dimension of the vertical vibration isolation unit, so that the plane dimension of the vertical vibration isolation unit may be adjusted at will, that is, the cross-sectional area of the vertical vibration isolation unit may be adjusted at will, on the premise that the first sliding end portion 40 and the first support plate 10 may be slidable relative to each other, and the second sliding end portion 50 and the second support plate 20 may be slidable relative to each other.

It may be understood that, other conditions remain unchanged, the larger the cross-sectional area of the vertical vibration isolation unit, the greater the vertical bearing capacity of the vertical vibration isolation unit. As a result, the vertical vibration isolation unit may adjust its cross-sectional area based on different vibration intensities and masses of the upper structure to be supported, so as to meet the requirements of the upper structure for the vertical bearing capacity of the double-friction pendulum three-dimensional vibration isolation bearing, thereby improving the versatility and practicability of the double-friction pendulum three-dimensional vibration isolation bearing. For example, when the vertical load of the upper structure increases, it only needs to replace with the vertical vibration isolation unit with a larger cross-sectional area to increase the cross-sectional area of the vertical vibration isolation unit, without replacing the first support plate 10 and the second support plate 20 that are already connected to the structures. The replacement process is fast and the disturbance to the structures is small.

According to the double-friction pendulum three-dimensional vibration isolation bearing according to the embodiment of the present disclosure, the vertical vibration isolation unit is disposed between the first support plate and the second support plate, the first sliding end portion is disposed between the vertical vibration isolation unit and the first support plate, the second sliding end portion is disposed between the vertical vibration isolation unit and the second support plate, the first sliding end portion is slidable relative to the first support plate, and the second sliding end portion is slidable relative to the second support plate, which may not only allow the vertical vibration isolation unit to be movable relative to the first support plate and the second support plate to achieve horizontal vibration isolation, but also prevent the vertical vibration isolation unit from directly matching with the first support plate and the second support plate to eliminate the limitation on the magnitude of the cross-sectional area of the vertical vibration isolation unit by the first support plate and the second support plate, and to facilitate the adjustment of the vertical bearing capacity of the double-friction pendulum three-dimensional vibration isolation bearing to meet the vertical vibration isolation requirements in different vibration environments.

In some embodiments, as shown in FIG. 2, the vertical vibration isolation unit includes a first connecting plate 301, a second connecting plate 302 and an elastic support member 304. The first connecting plate 301 and the second connecting plate 302 are spaced apart from each other in the up-down direction. The first connecting plate 301 is located above the second connecting plate 302. The elastic support member 304 is disposed between the first connecting plate 301 and the second connecting plate 302. The first connecting plate 301 is in contact with the first sliding end portion 40, and the second connecting plate 302 is in contact with the second sliding end portion 50.

Preferably, the first connecting plate 301 has a centrally symmetric shape same as the second connecting plate 302.

Figure 3:
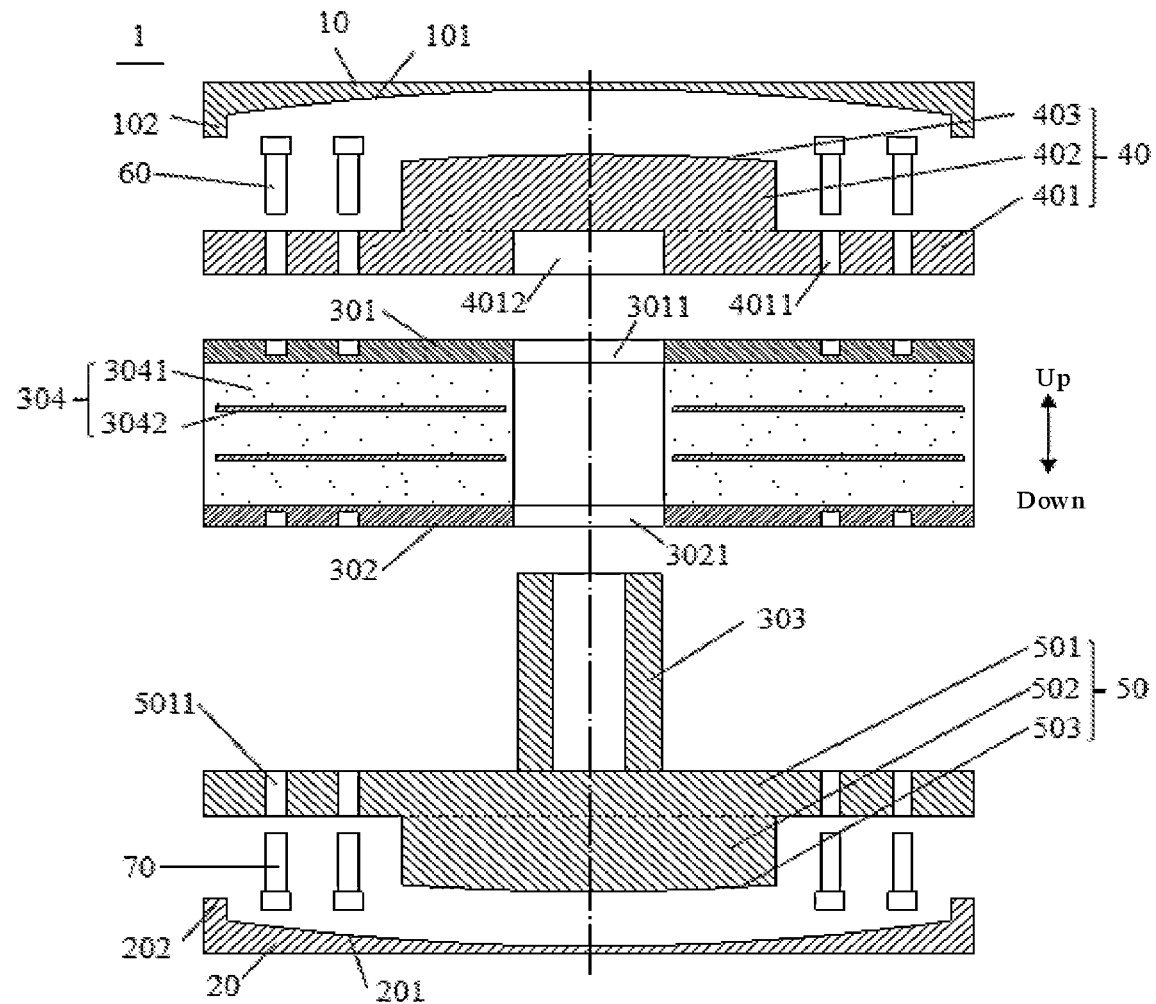
FIG. 3 is an exploded view of the cross-sectional view of the double-friction pendulum three-dimensional vibration isolation bearing in FIG. 1.

In some embodiments, as shown in FIGS. 1 to 3, the first sliding end portion 40 includes a first connecting portion 401 and a first sliding block 402. The first sliding block 402 has an upper end surface in contact with the first sliding friction surface 101. The first sliding block 402 has a lower end surface connected to an upper end surface of the first connecting portion 401. The first connecting portion 401 has a lower end surface in contact with an upper end surface of the first connecting plate 301. The first sliding block 402 has a cross-sectional area smaller than a cross-sectional area of the first connecting portion 401.

As shown in FIG. 2 and FIG. 3, the vertical vibration isolation unit has an upper end in contact with the first connecting portion 401. Therefore, when the first sliding block 402 with a smaller cross-sectional area is matched with the first sliding friction surface 101, it may have a larger slidable space, and the first connecting portion 401 with a larger cross-sectional area in contact with the vertical vibration isolation unit may ensure the stability of the connection between the first sliding end portion 40 and the vertical vibration isolation unit.

As shown in FIG. 2 and FIG. 3, the second sliding end portion 50 includes a second connecting portion 501 and a second sliding block 502. The second sliding block 502 has a lower end surface in contact with the second sliding friction surface 201. The second sliding block 502 has an upper end surface connected to a lower end surface of the second connecting portion 501. The second connecting portion 501 has an upper end surface connected to a lower end surface of the second connecting plate 302. The second sliding block 502 has a cross-sectional area smaller than a cross-sectional area of the second connecting portion 501.

As shown in FIG. 2 and FIG. 3, the vertical vibration isolation unit has a lower end in contact with the second connecting portion 501. Therefore, when the second sliding block 502 with a smaller cross-sectional area is matched with the second sliding friction surface 201, it may have a larger slidable space, and the second connecting portion 501 with a larger cross-sectional area in contact with the vertical vibration isolation unit may ensure the stability of the connection between the second sliding end portion 50 and the vertical vibration isolation unit.

In some embodiments, as shown in FIG. 2 and FIG. 3, the elastic support member 304 is laminated rubber, including a plurality of elastic support blocks 3041 and a plurality of inner plates 3042. The plurality of elastic support blocks 3041 is stacked in the up-down direction. One inner plate 3042 is disposed between two adjacent elastic support blocks 3041.

Therefore, the inner plate may restrain the lateral deformation of the elastic support member, improve the stiffness and structural strength of the elastic support member, so that the elastic support member is not easily deformed irreversibly under the action of high compressive load, and the supporting capacity of the elastic support member is improved. Preferably, the elastic support block is a rubber member, and the inner plate is made of hard materials such as steel.

Further, as shown in FIG. 2 and FIG. 3, the vertical vibration isolation unit further includes a guide rod 303. The guide rod 303 has a lower end connected to an upper end surface of the second sliding end portion 50. The first connecting plate 301 has a first perforation 3011 defined therein, the second connecting plate 302 has a second perforation 3021 defined therein, and the lower end surface of the first connecting portion 401 has a first groove 4012 defined thereon. The first groove 4012, the first perforation 3011 and the second perforation 3021 are opposite to each other in the up-down direction. An upper end of the guide rod 303 passes through the first perforation 3011 and the second perforation 3021 and protrudes into the first groove 4012. A gap is defined between an upper end surface of the guide rod 303 and an inner bottom surface of the first groove 4012. The elastic support member 304 is sleeved over the guide rod 303. The elastic support member 304 has an upper end surface in contact with a lower end surface of the first connecting plate 301, and a lower end surface in contact with an upper end surface of the second connecting plate 302.

It may be understood that the compressive load applied by the upper structure on the double-friction pendulum three-dimensional vibration isolation bearing 1 acts on the first connecting plate 301 through the first support plate 10 and the first sliding end portion 40, and the first connecting plate 301 moves downward to compress the elastic support member 304. Since a gap is defined between the upper end of the guide rod 303 and the first groove 4012, the guide rod 303 does not bear compressive load. The vertical load of the upper structure is transmitted to the lower structure or the foundation through the first support plate 10, the first connecting plate 301, the elastic support member 304, the second connecting plate 302, and the second support plate 20 in sequence.

Figure 4:
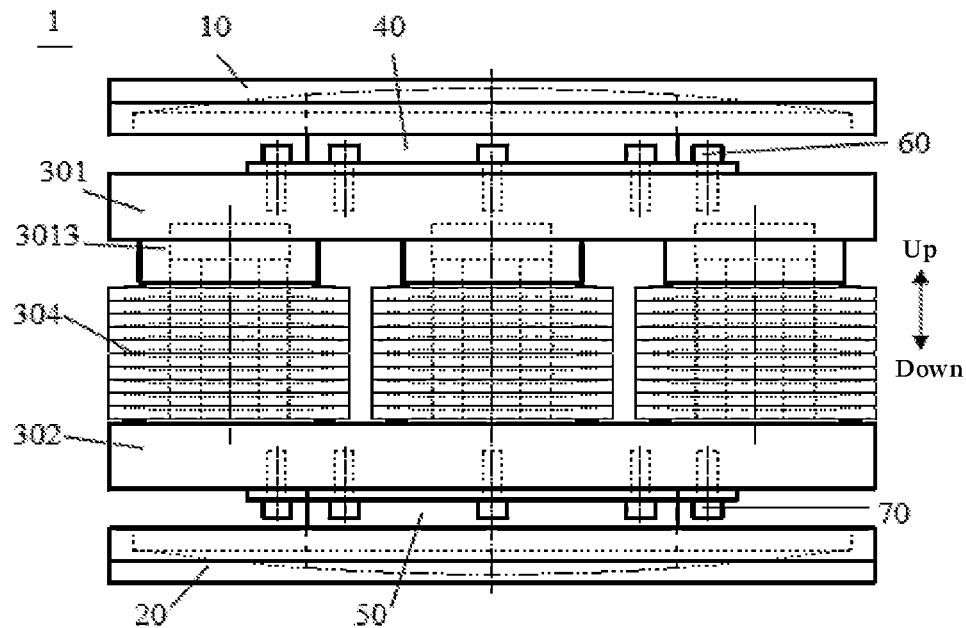
FIG. 4 is a schematic structural diagram of a double-friction pendulum three-dimensional vibration isolation bearing according to another embodiment of the present disclosure.
Figure 5:
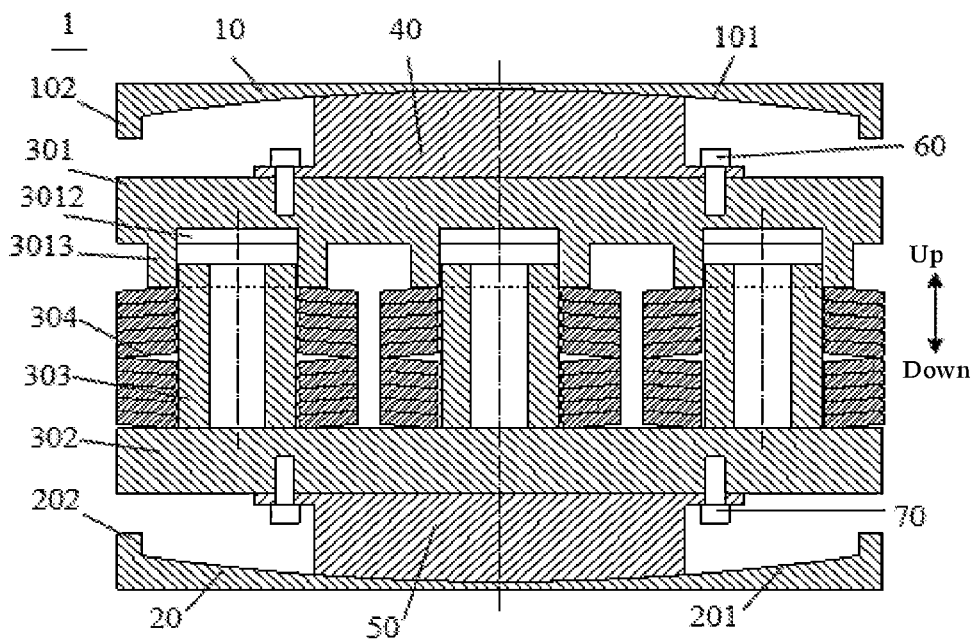
FIG. 5 is a cross-sectional view of the double-friction pendulum three-dimensional vibration isolation bearing in FIG. 4.

It may be understood that the guide rod 303 may guide the compression of the elastic support member 304. Specifically, as shown in FIG. 4 and FIG. 5, the second groove 3012 is a concave circular groove which has a diameter slightly larger than a diameter of the guide rod 303, which facilitates the relative movement of the guide rod 303 and the concave circular groove along an axis direction of the guide rod 303.

It should be noted that the vertical stiffness of the double-friction pendulum three-dimensional vibration isolation bearing 1 is approximately equal to the vertical stiffness of the elastic support member 304. Since the elastic support member 304 has a large vertical bearing capacity and a small vertical stiffness, the double-friction pendulum three-dimensional vibration isolation bearing 1 has a smaller vertical natural vibration period, and the internal deformation of the elastic support member 304 also absorbs vibration energy, so as to realize vertical vibration isolation.

In addition, when the vibration in the horizontal direction acts on the three-dimensional vibration isolation bearing 1, the first support plate 10 slides relative to the first sliding end portion 40, and provides a lateral force to the first sliding end portion 40, to allow an inner wall of the first groove 4012 to be in contact with the guide rod 303, and since the elastic support member 304 does not bear the lateral force, the horizontal load is transmitted through the first support plate 10, the first sliding end portion 40, the guide rod 303, the second sliding end portion 50, and the second support plate 20 in sequence.

Further, a gap is defined between the elastic support block 3041 and the guide rod 303. It may be understood that the elastic support block 3041 is sleeved over the guide rod 303. When the double-friction pendulum three-dimensional vibration isolation bearing 1 is subjected to vertical compressive load, the elastic support block 3041 expands laterally under compressive load. By leaving a gap between the elastic support block 3041 and the guide rod 303, a space for the elastic support block 3041 to swell is provided, and the contact between the elastic support block 3041 and the guide rod 303 may be prevented from affecting the up and down movement of the guide rod 303, and the structure is reasonable.

Figure 6:
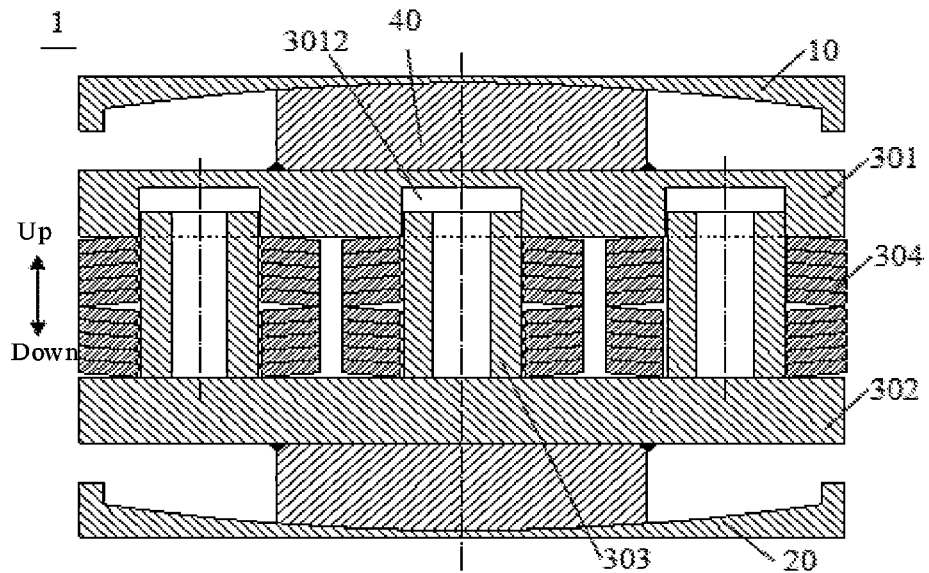
FIG. 6 is a cross-sectional view of a double-friction pendulum three-dimensional vibration isolation bearing according to yet another embodiment of the present disclosure.

In addition, the elastic support member 304 is not limited to those shown in FIG. 1, FIG. 2 and FIG. 3, for example, as shown in FIG. 4, FIG. 5 and FIG. 6, the elastic support member 304 is a plurality of disc springs stacked in the up-down direction.

Figure 7:
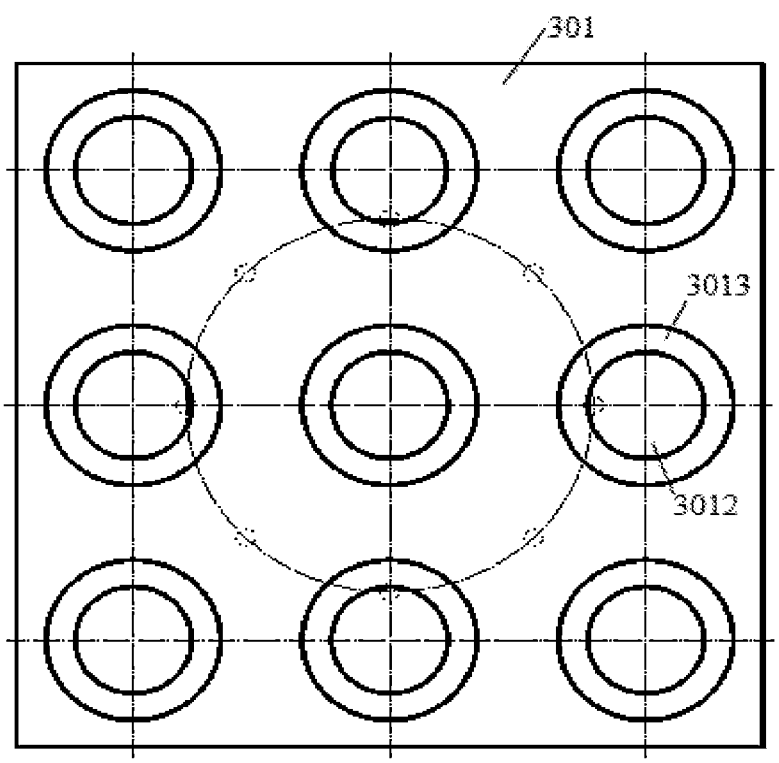
FIG. 7 is a bottom view of a first connecting plate of the double-friction pendulum three-dimensional vibration isolation bearing in FIG. 4.

Further, as shown in FIGS. 6 and 7, when the elastic support member 304 is a disc spring, the first connecting plate 301 has a second groove 3012 defined on a lower end surface thereon, the guide rod 303 has a lower end connected to an upper end surface of the second connecting plate 302, and an upper end engaged in the second groove 3012, and a gap is defined between an upper end surface of the guide rod 303 and an inner bottom surface of the second groove 3012.

In addition, considering the limited bearing capacity of a single disc spring, a plurality of sets of disc springs is required to bear a large vertical load. Therefore, as shown in FIG. 6, a plurality of grooves 3011, a plurality of guide rods 303 and a plurality of elastic support members 304 are provided. The plurality of second grooves 3012 is symmetrically arranged at intervals relative to a center point of the first connecting plate 301. The plurality of second grooves 3012, the plurality of guide rods 303, and the plurality of elastic supports 304 correspond to each other. In this way, the vibration isolation capability and vibration isolation reliability of the double-friction pendulum three-dimensional vibration isolation bearing 1 may be improved.

Further, the second groove 3012 is not limited to the arrangement shown in FIG. 6. For example, as shown in FIG. 4 and FIG. 5, a plurality of protruding pillars 3013 is arranged on the lower end surface of the first connecting plate 301. The second groove 3012 is defined on a lower end surface of each protruding pillar 3013. The upper end of the guide rod 303 protrudes into the second groove 3012 on the protruding pillar 3013, and the lower end surface of the protruding pillar 3013 is in contact with the upper end surface of the elastic support member 304, which is equivalent to increasing the equivalent depth of the second groove 3012 without requiring that the thickness of the first connecting plate 301 must be greater than the maximum vertical displacement of the guide rod 303, so that the thickness of the first connecting plate 301 may be optimized and materials are saved. Further, as shown in FIG. 5, the double-friction pendulum three-dimensional vibration isolation bearing 1 further includes a first connecting member 60 and a second connecting member 70. The first connecting portion 401 has a first through hole 4011 penetrating the first connecting portion 401 in the up-down direction, and the first connecting member 60 passes through the first through hole 4011 and protrudes into the first connecting plate 301. The second connecting portion 501 has a second through hole 5011 penetrating the second connecting portion 501 in the up-down direction, and the second connecting member 70 passes through the second through hole 5011 and protrudes into the second connecting plate 302.

Thus, the first sliding end portion 40 is detachably connected to the vertical vibration isolation unit, and the second sliding end portion 50 is detachably connected to the vertical vibration isolation unit. When a first convex arc surface 403 or a second convex arc surface 503 is worn, compared with the case where the vertical vibration isolation unit is in direct contact with the first support plate 10 and the second support plate 20 and the vertical vibration isolation unit needs to be replaced as a whole, in the present disclosure, only the first sliding end portion 40 or the second sliding end portion 50 needs to be replaced, so that the service life of the double-friction pendulum three-dimensional vibration isolation bearing 1 may be prolonged and the maintenance cost may be reduced.

In some embodiments, as shown in FIG. 5, the first sliding friction surface 101 is recessed upward, and the second sliding friction surface 201 is recessed downward and is opposite to the first sliding friction surface 101 in the up-down direction.

Further, as shown in FIG. 5, the upper end surface of the first sliding end portion 40 is a first convex arc surface 403, and the first convex arc surface 403 has a curvature radius same as a curvature radius of the first sliding friction surface 101, and an area equal to or smaller than an area of the first sliding friction surface 101. Therefore, the first convex arc surface 403 may be completely attached with the first sliding friction surface 101, so that the relative sliding of the first sliding end portion 40 and the first support plate 10 is smooth to realize horizontal vibration isolation.

A lower end surface of the second sliding end portion 50 is a second convex arc surface 503, and the second convex arc surface 503 has a curvature radius same as a curvature radius of the second sliding friction surface 201, and an area equal to or smaller than an area of the second sliding friction surface 201. Therefore, the second convex arc surface 503 may be completely attached with the second sliding friction surface 201, so that the relative sliding of the second sliding end portion 50 and the second support plate 20 is smooth to realize horizontal vibration isolation.

Further, as shown in FIG. 2, FIG. 5 and FIG. 7, the first support plate 10 has a first retaining ring 102 provided thereon and extending downwardly, and the first retaining ring 102 is disposed on an outer periphery of the first sliding friction surface 101. The second support plate 20 has a second retaining ring 202 provided thereon and extending upwardly, and the second retaining ring 202 is disposed on an outer periphery of the second sliding friction surface 201.

It may be understood that the second convex arc surface 503 may be limited in position by the first retaining ring 102, and the second convex arc surface 503 may be limited in position by the second retaining ring 202, so as to prevent the displacement of the first sliding end portion 40 or the second sliding end portion 50 from being too large, to slide out of the first sliding friction surface 101 or the second sliding friction surface 201.

Further, in the embodiment shown in FIG. 2, the first sliding friction surface 101 has a curvature radius same as a curvature radius of the second sliding friction surface 201. It may be understood that the curvature radii of the first sliding friction surface 101, the second sliding friction surface 201, the first convex arc surface 403 and the second convex arc surface 503 are suggested to be the same value to simplify the design and manufacturing process.

The double-friction pendulum three-dimensional vibration isolation bearings are described below according to some specific examples of the present disclosure with reference to FIGS. 1 to 7.

Example 1

As shown in FIGS. 1 to 3, the double-friction pendulum three-dimensional vibration isolation bearing 1 according to the embodiment of the present disclosure includes a first support plate 10, a second support plate 20, a first sliding end portion 40, and a second sliding end portion 50, a vertical vibration isolation unit, a guide rod 303, an elastic support member 304, a first connecting member 60 and a second connecting member 70.

The first support plate 10 and the second support plate 20 are spaced apart from each other in an up-down direction. The first support plate 10 is located above the second support plate 20. The first support plate 10 has a first retaining ring provided thereon and extending downwardly, a lower end surface as a first sliding friction surface 101. The first retaining ring 102 is disposed on an outer periphery of the first sliding friction surface 101. The second support plate 20 has a second retaining ring 202 provided thereon and extending upwardly, an upper end surface as a second sliding friction surface 201. The second retaining ring 202 is disposed on an outer periphery of the second sliding friction surface 201.

The first sliding end portion 40, the vertical vibration isolation unit and the second sliding end portion 50 are arranged between the first support plate 10 and the second support plate 20, and the first sliding end portion 40, the vertical vibration isolation unit and the second sliding end portion 50 are connected in sequence from top to bottom. The first sliding end portion 40 includes a first sliding block 402 and a first connecting portion 401. An upper end surface of the first sliding block 402 is a first convex arc surface 403. The convex arc surface 403 has a curvature radius same as a curvature radius of the first sliding friction surface 101, and an area equal to or smaller than an area of the first sliding friction surface 101. The first convex arc surface 403 is attached with the first sliding friction surface 101. The first sliding end portion 40 is slidable relative to the first support plate 10.

The second sliding end portion 50 includes a second sliding block 502 and a second connecting portion 501. A lower end surface of the second sliding block 502 is a second convex arc surface 503. The second convex arc surface 503 has a curvature radius same as a curvature radius of the second sliding friction surface 201, and an area equal to or smaller than an area of the second sliding friction surface 201. The second convex arc surface 503 is attached with the second sliding friction surface 201. The second sliding end portion 50 is slidable relative to the second support plate 20.

The vertical vibration isolation unit includes a first connecting plate 301 and a second connecting plate 302 spaced apart from and located below the first connecting plate 301. The first connecting plate 301 has a first perforation 3011 defined on a center of the first connecting plate 301 and the first perforation 3011 penetrates the first connecting plate 301 in the up-down direction, and the second connecting plate 302 has a second perforation 3021 defined on a center of the second connecting plate 302 and the second perforation 3021 penetrates the second connecting plate 302 in the up-down direction. The first connecting portion 401 has a first groove 4012 defined thereon. The first groove 4012, the first perforation 3011 and the second perforation 3021 are opposite to each other in the up-down direction.

A lower end of the guide rod 303 is connected to an upper end surface of the second connecting portion 501, and an upper end of the guide rod 303 passes through the first perforation 3011 and the second perforation 3021 and protrudes into the first groove 4012. A gap is defined between an upper end surface of the guide rod 303 and an inner bottom surface of the first grooves 4012. The elastic support member 304 is sleeved over the guide rod 303. The elastic support member 304 has an upper end surface in contact with a lower end surface of the first connecting plate 301 and a lower end surface in contact with an upper end surface of the second connecting plate 302. The elastic support member 304 includes a plurality of rubber blocks stacked in the up-down direction, and a metal inner plate 3042 is provided between two adjacent rubber blocks.

The first connecting portion 401 has a first through hole 4011 penetrating the first connecting portion 401 in the up-down direction, and the second connecting portion 501 has a second through hole 5011 penetrating the second connecting portion 501 in the up-down direction. The first connecting member 60 passes through the first through hole 4011 and protrudes into the first connecting plate 301 to connect the first sliding end portion 40 to the vertical vibration isolation unit. The second connecting portion 501 has a second through hole 5011 penetrating the second connecting portion 501 in the up-down direction. The second connecting member 70 passes through the second through hole 5011 and protrudes into the second connecting plate 302 to connect the second sliding end portion 50 to the vertical vibration isolation unit.

Example 2

As shown in FIG. 4, FIG. 5 and FIG. 7, different from Example 1, the elastic support member 304 is a plurality of stacked disc springs, and the lower end surface of the first connecting plate 301 is provided with a plurality of protruding pillars 3013 arranged at intervals. The plurality of protruding pillars 3013 is symmetrically distributed relative to a center point of the first connecting plate 301. The lower end surface of each protruding pillar 3013 has a second groove 3012 defined thereon. A plurality of guide rods 303 are provided and the plurality of guide rods 303 is in one-to-one correspondence with the plurality of second grooves 3012. The lower end of the guide rod 303 is connected to the upper end surface of the second connecting plate 302. The upper end of the guide rod 303 protrudes into the corresponding second groove 3012. A gap is defined between the upper end surface of the guide rod 303 and the bottom wall of the second groove 3012. An elastic support member 304 is sleeved over each guide rod 303. The lower end surface of the elastic support member 304 is in contact with the upper end surface of the second connecting plate 302, and the upper end surface of the elastic support member 304 is in contact with the lower end surface of the protruding pillar 3013.

Example 3

As shown in FIG. 6, the difference from Example 2 is that the first sliding end portion 40 is fixedly connected to the first connecting plate 301, the second sliding end portion 50 is fixedly connected to the second connecting plate 302, and the second groove 3012 is directly defined on the lower end surface of the first connecting plate 301.

In the description of the present disclosure, it should be understood that the orientation or position relationship indicated by the term "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", or "circumferential", etc. is based on the orientation or position relationship shown in the drawing, and is only for the convenience for describing the present disclosure and simplifying the description, rather than indicating or implying that the pointed device or element must have a specific orientation, or be constructed or operated in a specific orientation, and therefore cannot be understood as a limitation to the present disclosure.

In addition, the terms "first" and "second" are only used for descriptive purposes, and cannot be understood as indicating or implying relative importance or implicitly indicating the number of indicated technical features. Therefore, the feature defined with "first" and "second" may explicitly or implicitly include at least one of the features. In the description of the present disclosure, "plurality" means at least two, such as two, three, etc., unless otherwise specifically defined.

In the present disclosure, unless otherwise clearly specified and limited, terms such as "mount", "connect", "connected to", "fix" and the like should be understood in a broad sense. For example, it may be fixed connection or detachable connection or integral connection; mechanical connection, electrical connection or communicating with each other; direct connection or indirect connection through an intermediate; or internal communication of two components or an interaction relationship between two components, unless otherwise clearly limited. For those of ordinary skill in the art, the specific meaning of the above-mentioned terms in the present disclosure can be understood according to specific circumstances.

In the present disclosure, unless expressly stipulated and defined otherwise, a first feature "on" or "under" a second feature may mean that the first feature is in direct contact with the second feature, or the first and second features are in indirect contact with each other through an intermediate. Moreover, the first feature "above", "over" the second feature may mean that the first feature is directly above or obliquely above the second feature, or simply mean that a level of the first feature is higher than a level of the second feature. The first feature "under" "below" the second feature may mean that the first feature is directly under or obliquely under the second feature, or simply mean that the level of the first feature is lower than the level of the second feature.

In the present disclosure, the terms "an embodiment," "some embodiments," "an example," "a specific example," or "some examples" mean that a particular feature, structure, material, or characteristic described in connection with the embodiment or example are included in at least one embodiment or example of the present disclosure. The schematic representations of the above terms throughout this specification are not necessarily referring to the same embodiment or example of the present disclosure. Furthermore, the described particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of the present disclosure have been shown and described above, it should be understood that above embodiments are just illustrative, and cannot be construed as limiting the present disclosure, and for those skilled in the art, changes, modifications, replacements, and variations can be made to the embodiments within the scope of the present disclosure.

What is claimed is:
1. A double-friction pendulum three-dimensional vibration isolation bearing, comprising:
a first support plate having a lower end surface as a first sliding friction surface, the first sliding friction surface being a concave spherical surface;
a second support plate having an upper end surface as a second sliding friction surface, the second sliding friction surface being a concave spherical surface, wherein the second support plate and the first support plate are spaced apart from each other in an up-down direction, wherein the second support plate is located below the first support plate, and wherein at least one of the first support plate and the second support plate is movable in a horizontal direction;
a vertical vibration isolation unit disposed between the first support plate and the second support plate, and the vertical vibration isolation unit being slidable relative to the first support plate and the second support plate;
a first sliding end portion located between the first support plate and the vertical vibration isolation unit, the first sliding end portion being slidable relative to the first sliding friction surface, and having a lower end connected to a top of the vertical vibration isolation unit and an upper end surface at least partially attached with the first sliding friction surface; and a second sliding end portion located between the second support plate and the vertical vibration isolation unit, the second sliding end portion being slidable relative to the second sliding friction surface, and having an upper end connected to a bottom of the vertical vibration isolation unit and a lower end surface at least partially attached with the second sliding friction surface;

wherein:

the vertical vibration isolation unit comprises:
a first connecting plate in contact with the first sliding end portion;
a second connecting plate in contact with the second sliding end portion and spaced apart from the first connecting plate in the up-down direction, the first connecting plate being located above the second connecting plate, and the first connecting plate having a centrally symmetric shape same as the second connecting plate; and
an elastic support member disposed between the first connecting plate and the second connecting plate;

the first sliding end portion comprises:
a first connecting portion having a lower end surface in contact with an upper end surface of the first connecting plate; and
a first sliding block having an upper end surface in contact with the first sliding friction surface, and a lower end surface in contact with an upper end surface of the first connecting portion, the first sliding block having a cross-sectional area smaller than a cross-sectional area of the first connecting portion; and the second sliding end portion comprises:
a second connecting portion having an upper end surface connected to a lower end surface of the second connecting plate; and
a second sliding block having a lower end surface in contact with the second sliding friction surface and an upper end surface connected to a lower end surface of the second connecting portion, the second sliding block having a cross-sectional area smaller than a cross-sectional area of the second connecting portion.

2. The double-friction pendulum three-dimensional vibration isolation bearing according to claim 1, wherein the elastic support member is an elastic material block made of a pure elastic material or formed by alternately stacking a plurality of layers of rubber material blocks and a plurality of layers of metal plates.

3. The double-friction pendulum three-dimensional vibration isolation bearing according to claim 1, wherein the elastic support member is composed of disc springs based on a designed stacking method.

4. The double-friction pendulum three-dimensional vibration isolation bearing according to claim 2, wherein:
the vertical vibration isolation unit further comprises a guide rod having a lower end connected to an upper end surface of the second sliding end portion;
the first connecting plate has a first perforation defined therein;
the second connecting plate has a second perforation defined therein;
the lower end surface of the first connecting portion has a first groove defined thereon, the first groove, the first perforation, and the second perforation are opposite to each other in the up-down direction;

an upper end of the guide rod passes through the first perforation and the second perforation and protrudes into the first groove;
a gap is defined between an upper end surface of the guide rod and an inner bottom surface of the first groove; and
the elastic support member is sleeved over the guide rod, and has an upper end surface in contact with a lower end surface of the first connecting plate and a lower end surface in contact with an upper end surface of the second connecting plate.

5. The double-friction pendulum three-dimensional vibration isolation bearing according to claim 3, wherein:
the first connecting plate has a second groove defined on a lower end surface thereon;
the vertical vibration isolation unit further comprises a guide rod having a lower end connected to an upper end surface of the second connecting plate and an upper end engaged in the second groove, a gap being defined between an upper end surface of the guide rod and an inner bottom surface of the second groove; and
the elastic support member is sleeved over the guide rod, and has an upper end surface in contact with the lower end surface of the first connecting plate and a lower end surface in contact with an upper end surface of the second connecting plate.

6. The double-friction pendulum three-dimensional vibration isolation bearing according to claim 5, wherein a plurality of second grooves, a plurality of guide rods and a plurality of elastic support members are provided and correspond to each other, the plurality of guide rods being symmetrically arranged at intervals relative to a centroid center of the second connecting plate.

7. The double-friction pendulum three-dimensional vibration isolation bearing according to claim 6, wherein a plurality of protruding pillars is arranged on the lower end surface of the first connecting plate, the second groove being defined on a lower end surface of each of the plurality of protruding pillars.

8. The double-friction pendulum three-dimensional vibration isolation bearing according to claim 1, wherein:
the first connecting portion has a first through hole penetrating the first connecting portion in the up-down direction;
the second connecting portion has a second through hole penetrating the second connecting portion in the up-down direction;
the double-friction pendulum three-dimensional vibration isolation bearing further comprises:
a first connecting member passing through the first through hole and protruding into the first connecting plate; and
a second connecting member passing through the second through hole and protruding into the second connecting plate.

9. The double-friction pendulum three-dimensional vibration isolation bearing according to claim 1, wherein the upper end surface of the first sliding end portion is a first convex arc surface, and the first convex arc surface having a curvature radius same as a curvature radius of the first sliding friction surface, and an area equal to or smaller than an area of the first sliding friction surface; and
a lower end surface of the second sliding end portion is a second convex arc surface, the second convex arc surface having a curvature radius same as a curvature radius of the second sliding friction surface, and an area equal to or smaller than an area of the second sliding friction surface.

10. The double-friction pendulum three-dimensional vibration isolation bearing according to claim 8, wherein:

the first support plate has a first retaining ring provided thereon and extending downwardly, the first retaining ring being disposed on an outer periphery of the first sliding friction surface; and the second support plate has a second retaining ring provided thereon and extending upwardly, the second retaining ring being disposed on an outer periphery of the second sliding friction surface.

* * * * *